United States Patent
Uno et al.

[15] 3,681,649
[45] Aug. 1, 1972

[54] PHOTO FLASH INTENSITY CONTROL WITH VARIABLE RESISTOR IN FLASH TUBE DISCHARGE CIRCUIT

[72] Inventors: Naoyuki Uno, Oi-Machi, Iruma-gun; Seijiro Tokutomi, Fujisawa, both of Japan

[73] Assignee: Asahi Kogaku Kogyo Kabushiki Kaisha, Tokyo-to, Japan

[22] Filed: Sept. 10, 1970

[21] Appl. No.: 71,117

[30] Foreign Application Priority Data

Sept. 22, 1969 Japan..........................44/75483

[52] U.S. Cl..................315/151, 95/11.5 R, 250/205, 315/156, 315/241 P, 315/245
[51] Int. Cl...............................................H05b 41/40
[58] Field of Search......315/151, 152, 154, 156, 159, 315/241 R, 241 P, 245; 95/10, 115 R; 250/205

[56] References Cited

UNITED STATES PATENTS 3,418,904  12/1968  Wick et al.............95/11.5 R X
3,465,656  9/1969  Wick et al.................315/241 P

*Primary Examiner*—Roy Lake
*Assistant Examiner*—Siegfried H. Grimm
*Attorney*—Steinberg & Blake

[57] ABSTRACT

A system for controlling the extent to which flash illumination is provided during exposure of film in a camera. A preparatory flash and a main flash are provided with the system. Light from the preparatory flash is reflected from the object which is to be photographed to a photosensitive unit which responds to this reflected light for influencing the setting of a variable resistor whose setting is further influenced in accordance with additional exposure-determining factors, so that the variable resistor is set at a given value indicative of these exposure-determining factors as well as the light reflected during the preparatory flash. With the information thus stored at the variable resistor in the form of the given value of the setting thereof, this variable resistor is operatively connected to the main flash for controlling the extent of flash illumination provided thereby during actual film exposure.

9 Claims, 2 Drawing Figures

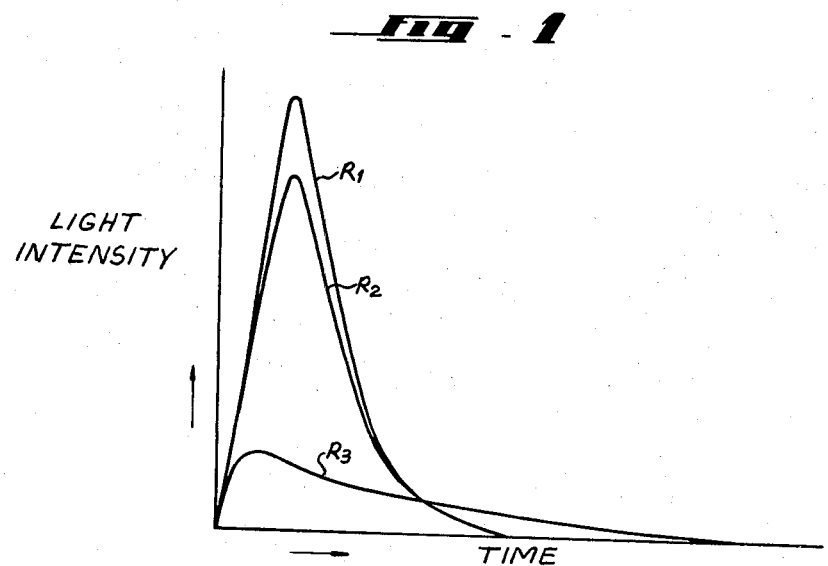
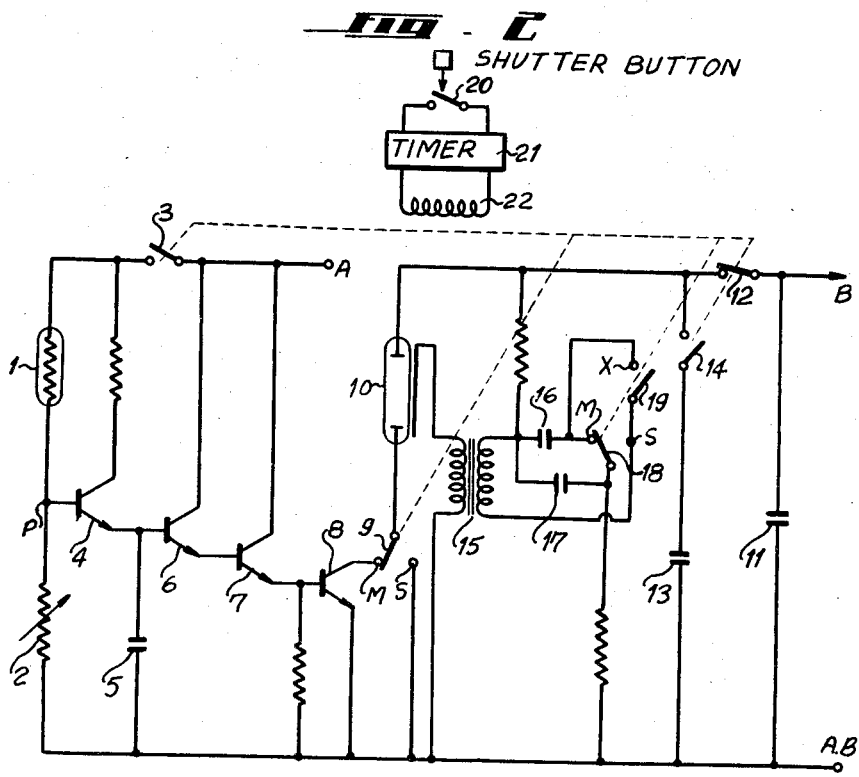

PHOTO FLASH INTENSITY CONTROL WITH VARIABLE RESISTOR IN FLASH TUBE DISCHARGE CIRCUIT

BACKGROUND OF THE INVENTION

The present invention relates to cameras.

More particularly, the present invention relates to flash control systems to be used for controlling the extent to which flash illumination is provided during exposure of film in a camera.

As is well known, it is possible to utilize for illumination of an object which is to be photographed an artificial illumination derived from a flash tube, for example. Conventionally, the operator of the camera will know of a certain guide number in accordance with the characteristics of the flash device, and in accordance with factors such as this guide number, the distance of the camera to the object, and the film speed, the operator will set into the camera a given exposure aperture size, the exposure time being predetermined and set at a given value for achieving proper synchronization of the film exposure with the flash illumination. These operations require a considerable inconvenience and skill on the art of the operator, particularly when the settings indicated according to calculations of this latter type are to be further modified by the experience and intuition of the operator in accordance with the particular conditions under which a photograph is made.

In view of the complications resulting from these conventional procedures, it has already been proposed t provide an automated type of flash illumination, but the known automatic flash illuminating devices suffer from several drawbacks. They are exceedingly expensive and complex. They require special components which are expensive. Thus, a truly satisfactory solution to the problem has not yet been achieved.

SUMMARY OF THE INVENTION

It is accordingly a primary object of the present invention to provide an exceedingly simple but highly effective system for achieving an automatic control of the flash illumination.

In particular, it is an object of the present invention to provide a structure which can achieve a precise automatic control of the flash illumination without requiring the introduction into the system of a factor such as the distance of the camera to the object.

In addition, it is an object of the invention to provide a construction which is composed of relatively simple and inexpensive components which will operate very reliably to achieve the desired results.

Furthermore, it is an object of the invention to provide a construction which can produce all of the required automatic operations simply in response to actuation of a shutter button to trip the shutter and initiate an exposure.

Furthermore it is an object of the invention to provide a construction of this type which is exceedingly compact so that it can be incorporated in a highly effective manner into a camera without undesirably increasing the size or weight thereof.

According to the invention a preparatory flash means is provided for achieving a preparatory flash illumination and a main flash means is provided for achieving a main flash illumination which is used during actual exposure of the film. A photosensitive means receives light reflected from the object during preparatory flash illumination, and this latter photosensitive means together with a means for introducing additional exposure-determining factors are operatively connected to a variable resistor means for setting the latter at a given value indicative not only of the exposure-determining factors but also of the light intensity reflected from the object in response to the preparatory flash illumination. When the main flash means is operated to provide illumination during actual film exposure, the variable resistor means is operatively connected with the main flash means to influence the operation thereof so as to achieve a proper exposure.

BRIEF DESCRIPTION OF DRAWINGS

The invention is illustrated by way of example in the accompanying drawings which form part of this application and in which:

FIG. 1 is a graph illustrating flash operation with different resistance values; and FIG. 2 is a schematic wiring diagram of one example of a system according to the present invention.

DESCRIPTION OF PREFERRED EMBODIMENTS

The present invention is based upon the well known principle that the extent to which light is derived from flash illumination, during discharge of a flash tube, diminishes as the value of a resistor increases, where this resistor is connected in series with the capacitor whose discharge energizes the flash tube. Thus, referring to FIG. 1 where the ordinate indicates light intensity while the abscissa indicates time, it will be seen that three curves are shown for three resistors $R_1$, $R_2$, and $R_3$. The resistor $R_1$ is of the smallest value while the resistor $R_3$ is of the greatest value and the resistor $R_2$ is at a value between that of resistors $R_1$ and $R_3$. As is apparent from FIG. 1, with the smallest resistance $R_1$ the greatest light intensity is achieved from a flash tube while with the largest resistance $R_3$ the smallest light intensity is achieved, and of course the intermediate resistor $R_2$ gives an intermediate light intensity.

Thus, in accordance with the present invention there is operatively connected with a flash tube a variable resistor which is in series with the flash tube to influence the operation thereof as illustrated by the graph of FIG. 1. This variable resistor is set in accordance with a number of factors so as to achieve a proper exposure from the flash illumination. One of these factors which determines the variable resistor is light reflected from the object which is to be photographed during a preparatory flash which is the same as the main flash illumination except for the amount of the flash illumination which is fixed for the preparatory flash purposes but which will vary during actual exposure in accordance with the setting of the variable resistor.

Referring to FIG. 2, there is schematically shown at the upper left portion thereof a photosensitive means 1 capable of receiving light reflected from the object which is to be photographed and providing in a well known manner a resistance value determined by the intensity of the light received from the object which is to be photographed. This photosensitive means 1 is connected in series with a variable resistor 2 which forms a means for introducing additional exposure-determining factors. Thus the variable resistor 2 is set in a well known manner at a value determined by the speed of the film which is exposed in the camera, the setting of the diaphragm, and the exposure time. These series-connected components 1 and 2 are electrically connected between the terminals A of a low-voltage current source which is not illustrated. A current-amplifying transistor 4 has its base connected to the junction P between the photosensitive means 1 and the variable resistor 2. The emitter of the transistor 4 is connected in series with an integrating capacitor 5.

The transistors 6 and 7 provide a high-input impedance amplifying circuit with the base of the transistor 6 connected to the emitter of the transistor 4 and the capacitor 5, so that the components 4-7 form an information-memorizing section.

According to one possible embodiment of the present invention, a variable resistor means is formed by a transistor 8 which has its base connected to the output terminal of the amplifying circuit 6, 7. The collector of the transistor 8 is electrically connected with a contact M of a change-over switch 9 which is electrically connected with one electrode of a flash-discharge tube 10 which serves as a single flash tube for providing preparatory and main flash illumination. The other contact S of the change-over switch 9 is electrically connected with a preparatory flash capacitor means 13 electrically connected through a switch 12 in parallel with a main flash capacitor means 11 which discharges during the synchronized exposure when the film in the camera is exposed in synchronism with the main flash illumination. These discharge capacitors 11 and 13 are in series with the flash tube 10.

In series with the capacitor 13 is a switch 14 which is interconnected with the switch 12 in such a way that when one of these switches is open the other is necessarily closed. The switch 14 is a normally open switch while the switch 12 is a normally closed switch, and these switches are controlled from a relay in a manner described below.

A trigger transformer 15 is provided for initiating the operation of the flash tube 10 with the high voltage secondary winding of the transformer 15 connected to an electrode of the flash tube 10 for initiating the operation thereof. The primary winding of the trigger transformer 15 is electrically connected with a main trigger capacitor 16 the charge of which is used for initiating operation of the flash tube 10 through the trigger transformer 15 in connection with main flash illumination. In parallel with the main trigger capacitor 16 is a preparatory trigger capacitor 17, these capacitors being connected in parallel with each other through a contact M of a change-over switch 18. This switch 18 has a contact S which is engaged and becomes operative when preparatory flash illumination is initiated through the preparator trigger capacitor 17.

As is well known, at a given fraction of a second after the shutter button is depressed to trip the shutter and make the exposure, a synchronizing switch is closed for initiating the main flash illumination in synchronism with the tripping of the shutter to expose the film, and for this purpose there is provided a synchronizing switch 19 which has an X contact engaged by the switch 19 when the latter is closed for providing the synchronized main flash illumination.

When the shutter button is depressed to initiate an exposure, a switch 20 is automatically closed in response to depression of the shutter button, as schematically indicated at the upper part of FIG. 2. This switch 20 serves to energize a timer 21 which in turn serves to maintain a relay 22 energized for a length of time determined by the timer 21. Thus, upon closure of the switch 20 by depression of the shutter button the timer 21 will maintain a supply of current to the relay 22 only until a given period of time has elapsed, after which the supply of current to the relay 22 is automatically terminated. This relay 22 serves when energized to close a normally open current-source switch 3, and also the change-over switches 9 and 18 which normally engage the contact M are moved into engagement with the contacts S respectively, in response to energizing of the relay 22. Also, in response to energizing of the relay 22 the normally closed switch 12 is opened while the normally opened switch 14 is closed. These connections between the relay and the several relay-controlled switches are indicated schematically in FIG. 2. The switches may actually take the form of a gang of leaf springs carrying switch contacts which move into and out of engagement with stationary contacts, and the distance between the stationary and movable contacts of each switch can be chosen so that the switches will operate in a given sequence with certain switches operating at short intervals after other switches in a manner described in greater detail below.

The above-described structure operates in the following manner:

When the shutter button is depressed to close the switch 20, the charging of the several capacitors has already been completed. Thus, the charging of the main flash capacitor 11, the preparatory flash capacitor 13, and the trigger capacitor 16 and 17 has been completed prior to closing of the switch 20 by depression of the shutter button. This switch 20 will thus close when the shutter is tripped in order to initiate an exposure. The closing of the switch 20 of course starts the running of the timer 21 and the relay 22 will remain energized during the time determined by the timer 21. Upon energizing of the relay 22 the switch 12 is opened, the switch 14 is simultaneously closed, and the current-source switch is closed. Very shortly thereafter, because of the gap between the stationary, movable contacts of the switch 9, the change-over switch 9 is changed over from its normal position engaging the contact M to its position engaging the contact S. Also, shortly after actuation of the above switches the switch 18 engages the contact S.

These switch operations provide a discharge through the preparatory flash trigger capacitor 17 so as to actuate the transformer 15 to initiate the operation of the flash tube 10 which now acts as the preparatory flash means. Thus, the discharge of the capacitor 17 acts through the high-voltage secondary winding of the transformer 15 to act on the electrode connected to this secondary winding for initiating the operation of the flash tube 10. At this time the closed switch 14 connects with the preparatory flash capacitor 13 in series with the flash tube 10 so that it is the discharge from the capacitor 13 which energizes the flash tube 10 so that the preparatory flash illumination is derived therefrom while the voltage at the terminals of the capacitor 13 gradually drops.

As a result of this preparatory flash illumination, the light therefrom will be reflected from the object which is to be photographed to the photosensitive means 1. The variable resistor 2 has of course been previously set to introduce the additional exposure-determining factors of the film speed, exposure time, and exposure aperture. The divided voltage from the current source resulting from the resistance values of the components 1 and 2 is applied to the base of the current-amplifying transistor 4. The resulting amplified current charges the integrating capacitor 5, and the extent of charge thereof corresponds to the integrated value of the light reflected from the object to be photographed as a result of the preparatory flash while also including any normal or natural light which is reflected. The voltage across the terminals of the capacitor 5 resulting from the charging thereof is applied through the high-input impedance amplifying circuit formed by the transistors 6 and 7 to the base of the transistor 8 which forms the variable resistor means, and thus this influencing of the transistor 8 serves to set the internal resistance thereof at a value which is indicative of the exposure-determining information including the factors of light reflected from the object due to the preparatory flash and the various other exposure-determining factors. This influence of the variable resistor means 8 sets the latter at a given resistance value which is subsequently used for controlling the main flash illumination.

The above operations are completed within a time period starting from the actuation of the relay 22, with all of the operations taking place within a period of within 5 ms, so that after elapse of period of time on the order of 5 ms, the timer 21 will terminate the energizing of the relay 22. The termination of the supply of current to the relay 22 after this period of time will thus take place after the above information has been memorized and retained in the form of the particular setting of the variable resistor means 8.

Upon termination of the energizing of the relay 22, the switch 3 opens, the change-over switches 9 and 18 return to the contact M, respectively, and the switch 14 opens while the switch 12 simultaneously closes. Therefore, the memorized information indicated by the value of the internal resistance of the transistor 8 is connected through the variable resistor means 8 in series with the flash tube 10 and the main discharge capacitor 11. Thus, the memorized information is applied to the base of the transistor 8 so that the internal resistance thereof has a given value corresponding to the memorized information.

At this time the switch 19 will engage the X contact so as to close the circuit through the main trigger capacitor 16 which now acts through the trigger transformer 15 on the discharge tube 10 for initiating the operation thereof, and now the discharge will take place from the main discharge capacitor 11. However, as is apparent from FIG. 1 and the above discussion the extent of illumination derived from the main flash means at this time will be determined by the setting of the variable resistor means 8. Thus, the resulting flash will provide an amount of light determined by the internal resistance value of the transistor 8 acting as a series-connected resistor operatively connected with the flash tube 10. In this way a proper exposure of the film is achieved in a fully automatic manner.

Thus, with the structure of the invention the preparatory flash provides the light reflected from the object to serve as part of the setting of the variable resistor means which is connected in series with the flash discharge tube, and this setting is automatically achieved. Therefore, such adjusting operations as might be required for introducing such exposure-determining factors as the distance of the camera to the object for a given intensity of flash are not at all required with the present invention. Therefore, the exposure control operations for achieving a synchronized flash exposure is considerably simpler than is achieved with conventional flash apparatus capable of providing an automatic control of the amount of exposure light. The entire arrangement of the invention is considerably simpler than conventional structures, so that the structure of the invention is a great practical significance.

It is to be noted that while the variable resistor means has been disclosed above as taking the form of a transistor whose internal resistance is set at a given value, it is also possible to connect in series with the flash tube 10 a variable resistor whose setting is adjusted from a servo-motor, actuated in accordance with the memorized information.

What is claimed is:

1. For use with a camera, preparatory flash means for providing preparatory flash illumination, photosensitive means for receiving from an object which is to be photographed light reflected from the object, variable resistor means operatively connected with said photosensitive means to be set thereby at a value influenced by the light received by said photosensitive means in response to said preparatory flash means, means operatively connected with said variable resistor means for additionally influencing the latter according to additional exposure-determining factors, so that said variable resistor means is set at a given value indicative of the light reflected from the object in response to the preparatory flash illumination and the additional exposure-determining factors, main flash means for providing flash illumination during exposure of film in the camera, and connecting means for connecting said variable resistor means to said main flash means after said variable resistor means has been set at said given value and for maintaining said variable resistor means operatively connected with said main flash means during operation of the latter, so that the main flash means is regulated to provide a proper exposure.

2. The combination of claim 1 and wherein said variable resistor means is a transistor having an internal resistance set at said given value.

3. The combination of claim 1 and wherein said preparatory and main flash means include a single flash tube and a pair of triggering circuits one of which is a preparatory triggering circuit for actuating said single flash tube to form said preparatory flash means and the other of which is a main triggering circuit for actuating said flash tube to provide said main flash means.

4. The combination of claim 3 and wherein said variable resistor means is a transistor having an internal resistance which assumes said given value.

5. The combination of claim 4 and wherein said means for influencing said variable resistor means according to additional exposure-determining factors includes a variable resistor connected in series with said photosensitive means.

6. The combination of claim 5 and wherein a junction interconnects said variable resistor forming said means for introducing said additional exposure-determining factors and said photosensitive means, a current-amplifying transistor connected with said junction, and an integrating capacitor operatively connected with an emitter of said current-amplifying transistor and connected to said transistor which forms said variable resistor means.

7. The combination of claim 6 and wherein a transistorized amplifier is connected between said integrating capacitor and a base of said transistor of said variable resistor means.

8. The combination of claim 7 and wherein said connecting means includes a switch connecting said transistor which forms said variable resistor means to said flash tube only when the latter provides the main flash illumination, a preparatory flash capacitor connected with said flash tube for providing a discharge through the latter during preparatory flash illumination, said switch connecting said flash tube into the circuit of said preparatory flash capacitor during preparatory flash illumination.

9. The combination of claim 8 and wherein a main flash capacitor is provided for discharging through said flash tube during main flash illumination, and additional switch means for connecting said main flash capacitor to said flash tube while said variable resistor means is connected in series therewith.

* * * * *